United States Patent
Saito

(10) Patent No.: US 10,181,312 B2
(45) Date of Patent: Jan. 15, 2019

(54) ACOUSTIC SYSTEM, COMMUNICATION DEVICE, AND PROGRAM

(71) Applicant: COTODAMA Inc., Tokyo (JP)

(72) Inventor: Jin Saito, Tokyo (JP)

(73) Assignee: LYRIC ARTS INC., Tokyo (JP)

( * ) Notice: Subject to any disclaimer, the term of this patent is extended or adjusted under 35 U.S.C. 154(b) by 0 days.

(21) Appl. No.: 15/515,752

(22) PCT Filed: Sep. 30, 2014

(86) PCT No.: PCT/JP2014/076181
§ 371 (c)(1),
(2) Date: Mar. 30, 2017

(87) PCT Pub. No.: WO2016/051534
PCT Pub. Date: Apr. 7, 2016

(65) Prior Publication Data
US 2017/0301328 A1    Oct. 19, 2017

(51) Int. Cl.
*G10H 1/36* (2006.01)
*G06F 3/16* (2006.01)
(Continued)

(52) U.S. Cl.
CPC ............ *G10H 1/365* (2013.01); *G06F 3/165* (2013.01); *G10H 1/00* (2013.01); *G10K 15/04* (2013.01);
(Continued)

(58) Field of Classification Search
CPC .. G10H 1/365; G10H 2240/211; G06F 3/165; H04M 1/72558; H04N 21/233
(Continued)

(56) References Cited

U.S. PATENT DOCUMENTS 5,046,004 A * 9/1991 Tsumura .................. G10H 1/26
360/32
5,610,986 A * 3/1997 Miles ........................ H04S 3/02
381/1
(Continued)

FOREIGN PATENT DOCUMENTS

EP         2251871 A1     11/2010
JP      2002-073049        3/2002
(Continued)

OTHER PUBLICATIONS

Translation of International Preliminary Report on Patentability and Written Opinion dated Apr. 4, 2017 from International Application No. PCT/JP2014/076181, 7 pages.
(Continued)

*Primary Examiner* — David Warren
*Assistant Examiner* — Christina Schreiber
(74) *Attorney, Agent, or Firm* — Meunier Carlin & Curfman LLC

(57) ABSTRACT

An acoustic system comprises an output unit, a communication unit, a first output control unit, and a second output control unit. The output unit is configured to be capable of outputting a sound and an image. The communication unit is configured to be capable of communicating with an external device. The first output control unit is configured to receive, from a communication device that transmits a reproduction signal for acoustic data, the reproduction signal via the communication unit and to cause the output unit to output a sound based on the reproduction signal, to thereby perform reproduction of a series of sounds represented by the acoustic data. The second output control unit is configured to cause the output unit to output, as the image, a word corresponding to the sound outputted by the output unit among the series of sounds represented by the acoustic data.

17 Claims, 8 Drawing Sheets

(51) Int. Cl.
*H04M 1/725* (2006.01)
*H04N 21/233* (2011.01)
*G10H 1/00* (2006.01)
*G10K 15/04* (2006.01)

(52) U.S. Cl.
CPC ...... *H04M 1/72558* (2013.01); *H04N 21/233* (2013.01); *G10H 2240/211* (2013.01)

(58) Field of Classification Search
USPC .......................................................... 84/610
See application file for complete search history.

(56) References Cited

U.S. PATENT DOCUMENTS

| | | | | |
|---|---|---|---|---|
| 6,668,158 B1* | 12/2003 | Tsutsui | ................... | G06Q 30/04 |
| | | | | 455/12.1 |
| 7,355,111 B2* | 4/2008 | Ikeya | ................... | G10H 1/0041 |
| | | | | 84/604 |
| 7,612,278 B2* | 11/2009 | Sitrick | ................. | G09B 15/002 |
| | | | | 84/609 |
| 2002/0023529 A1* | 2/2002 | Kurakake | ............ | G10H 1/0025 |
| | | | | 84/610 |
| 2002/0065817 A1* | 5/2002 | Ito | ..................... | G06F 17/30743 |
| 2003/0061115 A1* | 3/2003 | Wachi | ................... | G06Q 30/02 |
| | | | | 705/26.8 |
| 2003/0110925 A1* | 6/2003 | Sitrick | ................. | G09B 15/002 |
| | | | | 84/477 R |
| 2007/0119292 A1* | 5/2007 | Nakamura | ........... | G10H 1/0066 |
| | | | | 84/610 |
| 2008/0113325 A1* | 5/2008 | Mellqvist | ........... | G06Q 30/0601 |
| | | | | 434/307 A |
| 2009/0165634 A1* | 7/2009 | Mahowald | ............. | G10H 1/368 |
| | | | | 84/610 |
| 2009/0183622 A1* | 7/2009 | Parash | ................... | G10H 1/365 |
| | | | | 84/610 |
| 2010/0262899 A1* | 10/2010 | Harada | .................. | G10H 1/365 |
| | | | | 715/205 |
| 2010/0293464 A1* | 11/2010 | Harada | ................. | G06F 3/0485 |
| | | | | 715/716 |
| 2012/0221975 A1* | 8/2012 | Juristovski | ........ | G06F 17/30026 |
| | | | | 715/823 |
| 2013/0065213 A1* | 3/2013 | Gao | ....................... | G10H 1/365 |
| | | | | 434/307 A |
| 2014/0358566 A1* | 12/2014 | Zhang | ................... | G11B 27/00 |
| | | | | 704/500 |
| 2016/0325145 A1* | 11/2016 | Pinkerton | .......... | A63B 24/0075 |
| 2017/0301328 A1* | 10/2017 | Saito | ....................... | G10H 1/00 |
| 2018/0007487 A1* | 1/2018 | Kitazawa | ............. | H04R 25/407 |
| 2018/0047374 A1* | 2/2018 | Numata | ................. | G11B 27/34 |
| 2018/0098164 A1* | 4/2018 | Moriguchi | ............. | H04B 11/00 |

FOREIGN PATENT DOCUMENTS

| | | |
|---|---|---|
| JP | 2003-228375 | 8/2003 |
| JP | 2004-177586 | 6/2004 |
| JP | 2006-106039 | 4/2006 |
| JP | 2006-106286 | 4/2006 |
| JP | 2006106286 A * | 4/2006 |
| JP | 2008-083297 | 4/2008 |
| JP | 2008-197501 | 8/2008 |
| JP | 2008197501 A * | 8/2008 |
| JP | 2008-278328 | 11/2008 |
| JP | 2010-286812 | 12/2010 |
| JP | 2011-158669 | 8/2011 |
| JP | 2013-068900 | 4/2013 |
| JP | 2013-160890 | 8/2013 |
| WO | 2008056273 A1 | 5/2008 |

OTHER PUBLICATIONS

English Translation of Notice of Reason(s) for Rejection dated Dec. 9, 2016, from Japanese Patent Application No. 2014-201450, 4 pages.

International Search Report dated Nov. 11, 2014, from International Application No. PCT/JP2014/076181, 4 pages.

Extended European Search Report issued by the European Patent Office in application No. 14903120.5, dated Mar. 23, 2018 (12 pages).

Purdy, Kevin, "TuneWiki Puts Lyrics, Radio, and Social Features into Mobile Music", Lifehacker, Jul. 14, 2009, XP055208478.

* cited by examiner

ACOUSTIC SYSTEM, COMMUNICATION DEVICE, AND PROGRAM

TECHNICAL FIELD

The present invention relates to an acoustic system, a communication device, and a program.

BACKGROUND ART

Portable music reproduction devices are conventionally known. Recent portable communication devices, as typified by a smartphone, are generally provided with functions as music reproduction device. For example, such a communication device performs reproduction processing on musical piece data stored in a storage device, and outputs a musical piece corresponding to the musical piece data from an internal speaker.

Also known are speaker systems that perform wireless communication with a music reproduction device and that output a musical piece corresponding to musical piece data that has been reproduction-processed by the music reproduction device (see, for example, Patent Document 1).

PRIOR ART DOCUMENTS

Patent Documents

Patent Document 1: Japanese Unexamined Patent Application Publication No. 2008-278328

SUMMARY OF THE INVENTION

Problems to be Solved by the Invention

Many consumers nowadays tend to purchase musical piece data over a network to listen to their favorite musical pieces. In such cases, opportunities for the consumers to know detailed lyrics corresponding to the musical pieces are decreased partly because lyrics data is generally not included in the musical piece data. On the other hand, some musical piece providers wish the consumers to enjoy the musical pieces together with the lyrics thereof. Further, some consumers desire to enjoy the musical pieces together with the lyrics thereof.

In one aspect of the present invention, it is desirable to be able to provide at least one of an acoustic system that can enhance users' enjoyment or a communication device that can utilize the acoustic system.

Means for Solving the Problems

An acoustic system according to one aspect of the present invention comprises an output unit, a communication unit, a first output control unit, and a second output control unit. The output unit is configured to be capable of outputting a sound and an image. The communication unit is configured to be capable of communicating with an external device.

The first output control unit is configured to receive, from a communication device that transmits a reproduction signal for acoustic data, the reproduction signal via the communication unit and to cause the output unit to output a sound based on the reproduction signal. In such a configuration, the first output control unit can operate to perform reproduction of a series of sounds represented by the acoustic data through the output unit. The first output control unit may be configured to cause the output unit to output the sound based on the reproduction signal in response to receiving the reproduction signal (for example, in a sequential manner).

The second output control unit is configured to cause the output unit to output, as the image, a word corresponding to the sound outputted by the output unit among the series of sounds represented by the acoustic data. The second output control unit may be configured to acquire or generate the word corresponding to the sound outputted by the output unit among the series of sounds represented by the acoustic data and to cause the output unit to output the acquired or generated word as the image.

According to one aspect of the present invention, the acoustic system can output, as the image, the word corresponding to the sound synchronously with the output of the series of sounds represented by the acoustic data, and thus, users' enjoyment of listening to sounds can be enhanced.

Examples of the acoustic data may include musical piece data. The second output control unit may be configured to cause the output unit to output the word of lyrics corresponding to a part outputted by the output unit, in a musical piece represented by the musical piece data.

According to one aspect of the present invention, the acoustic system can output the musical piece in accordance with the reproduction signal generated by the reproduction processing performed on the musical piece data in the communication device, while being able to display the lyrics corresponding to the musical piece. In this case, for example, the users using the acoustic system can enjoy the musical piece as sounds and can have enjoyment by viewing its lyrics. Thus, according to one aspect of the present invention, the acoustic system can enhance the users' enjoyment. Examples of the communication device may include a communication device having a music reproduction function, such as a smartphone or a tablet, and a music reproduction device having a communication function.

Examples of the acoustic data may also include video data with voice sound. The second output control unit may be configured to cause the output unit to output, as the image, a subtitle corresponding to a part (voice sound in the video) outputted by the output unit in the video represented by the video data. Thus, according to one aspect of the present invention, the acoustic system can, for example, enhance the users' enjoyment of viewing the video.

The communication device may be configured to transmit a reproduction position signal representing a reproduction position, in the acoustic data, of the sound outputted on the basis of the reproduction signal. In this case, the second output control unit may be configured to receive the reproduction position signal from the communication device via the communication unit, and to cause the output unit to output, as the image, the word corresponding to the sound outputted by the output unit, on the basis of this reproduction position signal.

In addition, the acoustic system may comprise a counter that counts a reproduction period of time. In this case, the second output control unit may be configured to correct the reproduction period of time counted by the counter to a time corresponding to the reproduction position represented by the received reproduction position signal. Further, the second output control unit may be configured to cause the output unit to output, as the image, the word corresponding to the sound outputted by the output unit, on the basis of the reproduction period of time counted by the counter.

With such a configuration, the acoustic system can display the word corresponding to the output sound at an appropriate time even in a case where the reproduction position signal is transmitted less frequently from the communication device.

Thus, according to one aspect of the present invention, the acoustic system can inhibit a timing of displaying the word with respect to the sound from deviating inappropriately.

The acoustic system may comprise an acquisition control unit that acquires image output data corresponding to the acoustic data. The image output data may be configured to comprise a plurality of words corresponding to the series of sounds represented by the acoustic data. For example, the acquisition control unit may be configured to acquire the image output data corresponding to the acoustic data from at least one of the communication device or a server device, which is different from the communication device, via the communication unit.

The acquisition control unit may be configured to acquire the image output data from the server device via the communication unit using wide area communication. Alternatively, the acquisition control unit may be configured to acquire the image output data from the communication device via the communication unit using dedicated short-range communication. The first output control unit may be configured to receive the reproduction signal from the communication device in the vicinity via the communication unit using dedicated short-range communication. Additionally, the acquisition control unit may be configured to transmit the image output data acquired from the server device to the communication device via the communication unit.

The second output control unit may be configured to cause the output unit to output, as the image, the word corresponding to the sound outputted by the output unit among the plurality of words, on the basis of the image output data acquired by the acquisition control unit. Alternatively, the second output control unit may be configured to analyze the sound outputted by the output unit and to cause the output unit to output, as the image, the word represented by the sound, in accordance with results of such analysis. In this way, the second output control unit may be configured to generate the word corresponding to the sound outputted by the output unit. In this case, the image output data need not be used.

The acquisition control unit may be configured to receive identification data that allows for identification of the image output data corresponding to the acoustic data, from the communication device via the communication unit. In this case, the acquisition control unit may be configured to acquire the image output data corresponding to the acoustic data on the basis of the received identification data. As another example, the acquisition control unit may be configured to analyze at least one of the reproduction signal from the communication device or the sound outputted from the output unit, to thereby identify the image output data corresponding to the acoustic data.

Besides, the image output data may be configured to comprise information that defines, for each of the plurality of words, a correspondence relationship between the reproduction position of the sound in the acoustic data and the word. In this case, the second output control unit may be configured to cause the output unit to output, as the image, the word corresponding to the reproduction position of the sound outputted by the output unit among the plurality of words, on the basis of the information that defines the correspondence relationship.

Examples of the image output data may include lyrics data. When the acoustic data is musical piece data and the image output data is lyrics data, the second output control unit may be configured to cause the output unit to output, as the image, the word of lyrics corresponding to a part outputted by the output unit, in a musical piece represented by the musical piece data, on the basis of the lyrics data corresponding to the musical piece data.

Further, a communication device according to one aspect of the present invention comprises a transmission control unit that performs a reproduction processing on the acoustic data on condition that a reproduction command for the acoustic data has been inputted, and that transmits, to the acoustic system, a reproduction signal that causes the acoustic system to output a series of sounds represented by the acoustic data. The communication device may be configured to comprise a storage unit that stores the acoustic data.

The communication device may be configured to further comprise a transmission control unit that transmits, to the acoustic system, a reproduction position signal representing a reproduction position, in the acoustic data, of a sound outputted on the basis of the reproduction signal among the series of sounds represented by the acoustic data.

The communication device may comprise a display unit capable of outputting an image. The communication device may comprise a display control unit configured to receive the image output data corresponding to the acoustic data from the acoustic system, and to cause the display unit in the communication device to output, as the image, a word corresponding to a sound outputted by the output unit in the acoustic system, on the basis of the received image output data. In this case, the acoustic system can display the word corresponding to the sound synchronously with the sound output, and further, the communication device can display the word corresponding to the sound.

The communication device may comprise a display control unit that acquires the image output data corresponding to the acoustic data, and that transmits the image output data to the acoustic system, as well as causes the display unit to output, as the image, a word corresponding to a sound outputted by the output unit in the acoustic system, on the basis of the image output data.

According to one aspect of the present invention, the communication device may transmit, to the acoustic system, the reproduction signal and the reproduction position signal of the acoustic data; one of the communication device and the acoustic system may acquire the image output data corresponding to the acoustic data from the server device; and the other of the communication device and the acoustic system may acquire the image output data from one of the communication device and the acoustic system. In this case, the communication device and the acoustic system may synchronously output, as the image, the word corresponding to the sound output, concurrently with the sound output by the acoustic system (or in accordance with the reproduction position of the sound).

According to another aspect of the present invention, at least part of the functions of the acoustic system and the communication device can be performed by a computer through programs. For example, the communication device may be configured to comprise the computer (or a processor); and a memory that stores the programs that causes the computer (or the processor) to function as at least one of the units related to the above-described communication device.

The aforementioned programs may be, for example, programs that cause the computer in the communication device to perform a first transmission control step and a second transmission control step. The first transmission control step may be a step of performing a reproduction processing on acoustic data on condition that a reproduction command for the acoustic data has been inputted, and of transmitting, to the acoustic system, a reproduction signal that causes the acoustic system to output a series of sounds represented by the acoustic data. The second transmission control step may be a step of transmitting, to the acoustic system, a reproduction position signal representing a reproduction position, in the acoustic data, of an outputted sound.

These programs may be recorded on a recording medium of any form that can be read by the computer. The recording medium may be a tangible non-transitory recording medium. Examples of the tangible non-transitory recording media may include a semiconductor memory, a magnetic disk, an optical disk, and so on.

EXPLANATION OF REFERENCE NUMERALS

1 . . . music reproduction system, 10, 10A . . . communication terminal, 11 . . . control unit, 11A . . . CPU, 11B . . . memory, 13 . . . storage unit, 15 . . . user interface, 17 . . . communication unit, 50 . . . acoustic system, 51 . . . control unit, 51A . . . CPU, 51B . . . memory, 53 . . . speaker, 55 . . . display, 57 . . . communication unit, 90 . . . server device, 91 . . . control unit, 95 . . . database, 111, 611 . . . main controller, 113 . . . first transmission controller, 115 . . . second transmission controller, 511, 711 . . . data acquirer, 513 . . . reproduction controller, 515 . . . display controller, 517 . . . counter, DL . . . lyrics data, DM . . . musical piece data, NT . . . wide area network.

MODE FOR CARRYING OUT THE INVENTION

An embodiment of the present invention will be described below with reference to the drawings. It is to be noted that the present invention is not construed as being limited to the below embodiment. A mode in which part of the below embodiment is omitted is also an embodiment of the present invention. Any mode that can be conceived within a scope not departing from the substance of the invention specified solely by the language in the claims is also an embodiment of the present invention.

Figure 1:
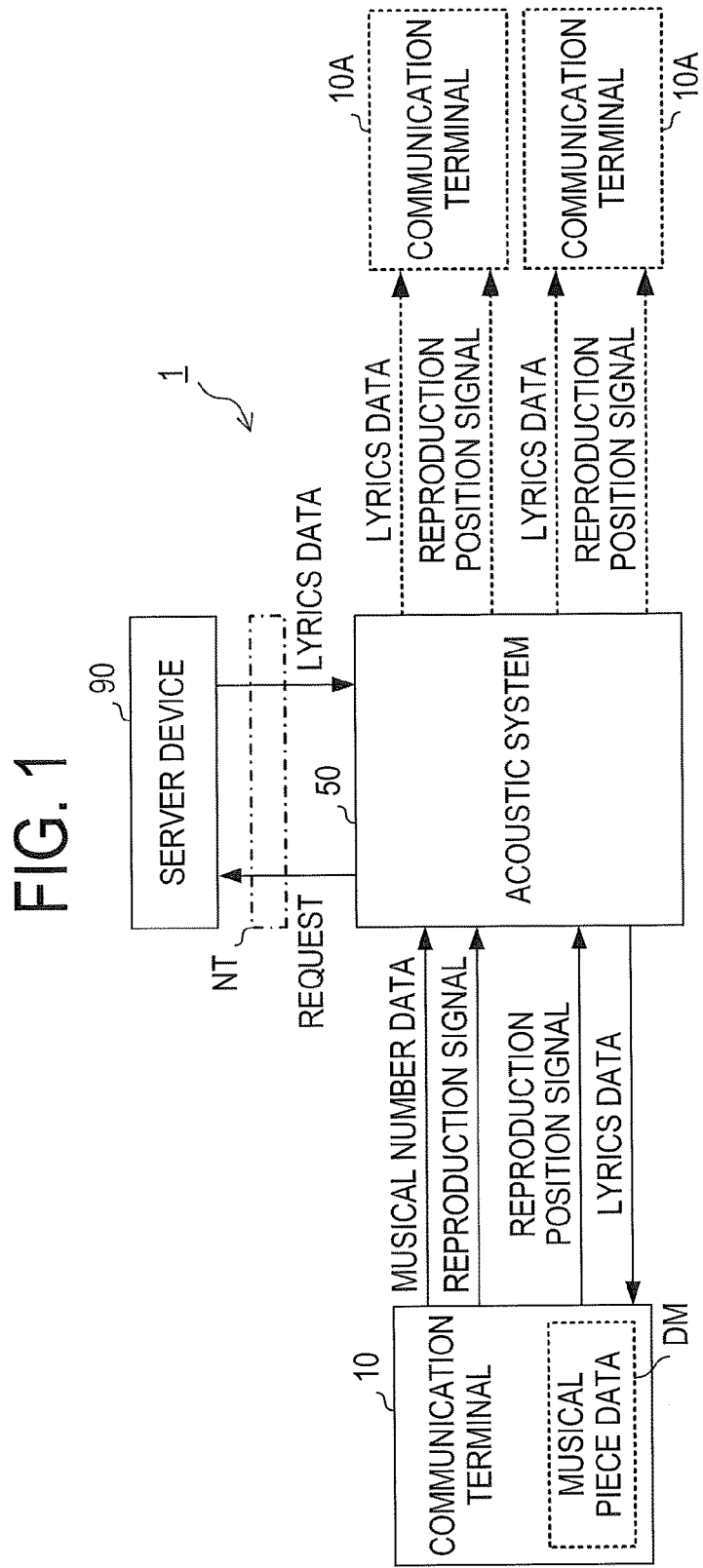
FIG. 1 is a block diagram showing a schematic configuration of a music reproduction system.

A music reproduction system 1 of the present embodiment shown in FIG. 1 comprises a communication terminal 10 of a portable type, an acoustic system 50, and a server device 90. Portions shown in broken lines in FIG. 1 are used later for explanation of a modified example. Examples of the communication terminal 10 may include a smartphone, a tablet, and so on.

In the music reproduction system 1, the communication terminal 10 performs a reproduction processing on musical piece data DM, and transmits a reproduction signal for the musical piece data DM to the acoustic system 50. The communication terminal 10 further transmits a reproduction position signal for the musical piece data DM to the acoustic system 50 synchronously with transmission of the reproduction signal. The communication terminal 10 is configured to transmit musical number data of a musical piece to be reproduced on the basis of the musical piece data DM to the acoustic system 50 prior to performing the aforementioned reproduction processing.

The acoustic system 50 acquires lyrics data DL corresponding to the musical piece data DM to be reproduction-processed from the server device 90 via a wide area network NT on the basis of the musical number data received from the communication terminal 10. Then, the acoustic system 50 receives the reproduction signal for the musical piece data DM transmitted from the communication terminal 10, and outputs the corresponding musical piece from a speaker 53 (see FIG. 2) integrated in the acoustic system 50 on the basis of this reproduction signal.

The acoustic system 50 further receives the reproduction position signal from the communication terminal 10, and displays, on a display 55 (see FIG. 2) integrated in the acoustic system 50, a character string of lyrics corresponding to a sound outputted from the speaker 53, on the basis of the reproduction position signal and the lyrics data DL acquired from the server device 90.

That is, the music reproduction system 1 of the present embodiment is configured to perform output of the musical piece and display of the lyrics corresponding to the musical piece data DM reproduction-processed by the communication terminal 10 at the acoustic system 50, which is a separate body from the communication terminal 10. Communication between the communication terminal 10 and the acoustic system 50 is performed using short-range communication, and communication between the acoustic system 50 and the server device 90 is performed using wide area communication through the wide area network NT.

The wide area network NT is, for example, the Internet. The dedicated short-range communication may be performed by at least one of short-distance wireless communication in accordance with the short-distance communication standard typified by Bluetooth (registered trademark) or wireless LAN communication in accordance with the IEEE 802.11 communication standard. The dedicated short-range communication performed by wireless LAN communication as referred to herein indicates communication within a local area network. The music reproduction system 1 functions usefully when the communication terminal 10 and the acoustic system 50 are in a close-range positional relationship, as in a case where both are located in the same room.

Figure 2:
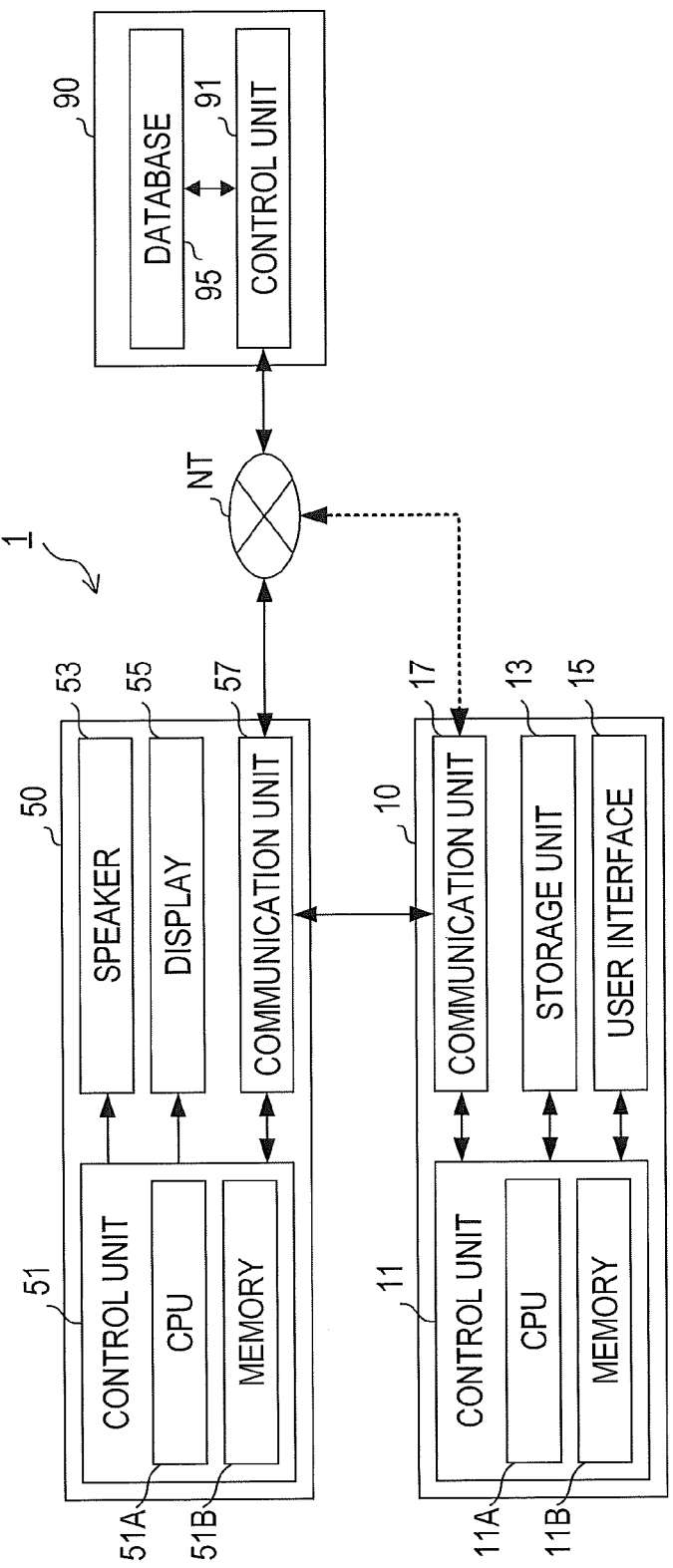
FIG. 2 is a block diagram showing a schematic configuration of a communication terminal, an acoustic system, and a server device.

As shown in FIG. 2, the communication terminal 10 of the present embodiment comprises a control unit 11, a storage unit 13, a user interface 15, and a communication unit 17. The control unit 11 comprises a CPU 11A and a memory 11B. The CPU 11A performs processing in accordance with various programs stored in the storage unit 13. The memory 11B comprises a RAM to be used as a work area when the CPU 11A performs the processing. The processing performed by the CPU 11A in accordance with the programs will be described below as being performed by the control unit 11.

The storage unit 13 is configured to allow for data reading and data writing by the control unit 11. The storage unit 13 stores the programs for performing various functions in the communication terminal 10 and various data. The various data comprise one or more musical piece data DM. The storage unit 13 is configured with, for example, a large-capacity flash memory.

The user interface 15 is configured to be capable of displaying various screens to a user and to be capable of accepting an operation from the user. The user interface 15 is configured to comprise, for example, a liquid crystal display and a touch panel (not shown). The user interface 15 is controlled by the control unit 11 to display the various screens, and inputs an operation signal from the user into the control unit 11.

The communication unit 17 comprises a short-distance wireless communication module and a wireless LAN communication module (not shown). Specifically, the communication unit 17 is configured to be capable of performing short-distance wireless communication in accordance with the aforementioned short-distance communication standard and wireless LAN communication in accordance with the IEEE 802.11 communication standard. The control unit 11 performs wireless communication with the acoustic system 50 via the communication unit 17.

The acoustic system 50 comprises a control unit 51, the speaker 53, the display 55, and a communication unit 57. The control unit 51 comprises a CPU 51A and a memory 51B, as well as not-shown circuits.

The CPU 51A performs processing in accordance with various programs. The memory 51B comprises a ROM that stores the various programs, and a RAM to be used as a work area when the CPU 51A performs the processing. The processing performed by the CPU 51A in accordance with the programs will be described below as being performed by the control unit 51.

The speaker 53 is configured to comprise a plurality of speaker units corresponding to multiple different sound ranges and an amplifier. The speaker 53 operates to convert an audio signal inputted from the control unit 51 into a sound and to output the sound.

The display 55 is configured as, for example, a liquid crystal display. The display 55 is controlled by the control unit 51 to display lyrics when a musical piece is being reproduced. Additionally, the display 55 is controlled by the control unit 51 to display visual effects when the musical piece is being reproduced. The visual effects as referred to herein mean animation in which at least one of colors or geometrical patterns is changed in rhythm to the musical piece.

As in the communication terminal 10, the communication unit 57 comprises a short-distance wireless communication module and a wireless LAN communication module (not shown). Specifically, the communication unit 57 is configured to be capable of performing short-distance wireless communication in accordance with the aforementioned short-distance communication standard and wireless LAN communication in accordance with the IEEE 802.11 communication standard. The control unit 51 performs short-distance communication or wireless LAN communication with the communication terminal 10 via the communication unit 57. Further, the control unit 51 performs wide area communication with the server device 90 arranged in the wide area network NT through communication via the communication unit 57.

The server device 90 is configured to comprise a control unit 91 and a database 95. The control unit 91 is configured to be capable of communicating with the acoustic system 50 through the wide area network NT. When receiving a request signal for the lyrics data DL from the acoustic system 50 through the wide area network NT, the control unit 91 operates to retrieve the lyrics data DL requested from the acoustic system 50 within the database 95 in accordance with the request signal.

If the aforementioned requested lyrics data DL can be found within the database 95 through the aforementioned retrieval, the control unit 91 transmits a response signal including such lyrics data DL to the acoustic system 50. In contrast, if the lyrics data DL cannot be found, the control unit 91 operates to transmit a response signal to that effect to the acoustic system 50 through the wide area network NT.

Figure 3:
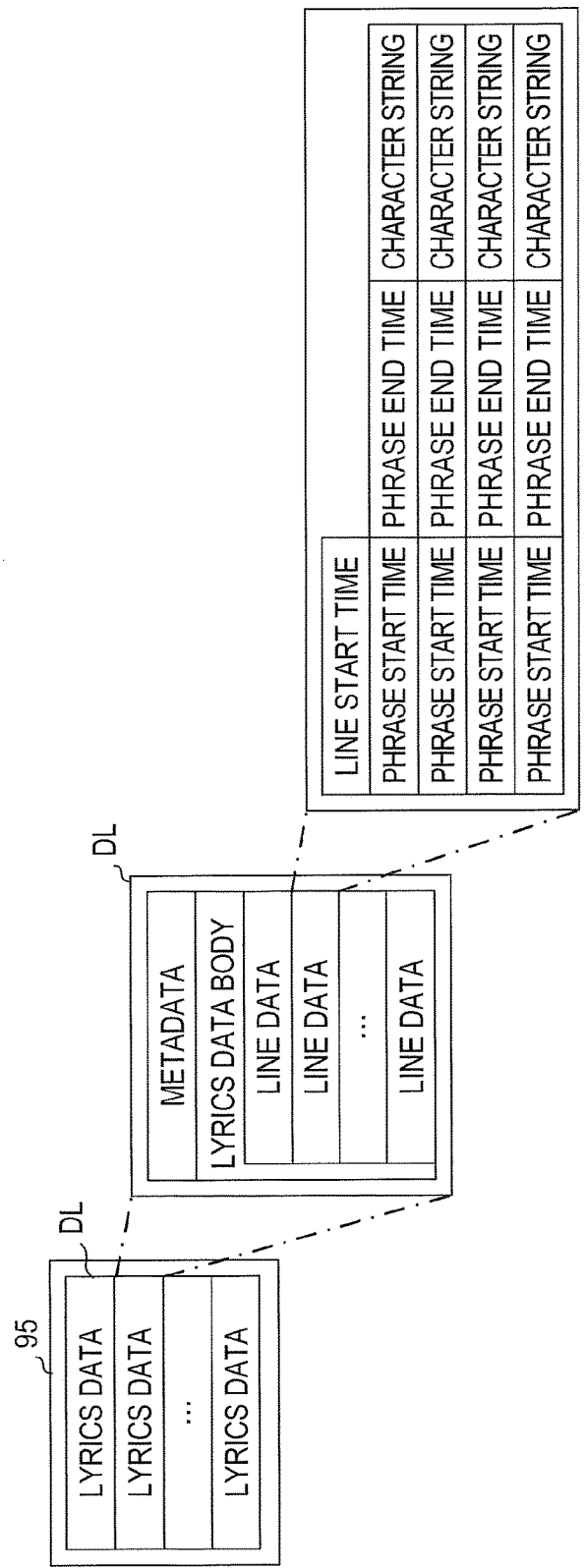
FIG. 3 is a diagram showing a schematic configuration of lyrics data.

As shown in FIG. 3, the database 95 is configured to comprise the lyrics data DL for each musical piece. As shown in FIG. 3, the lyrics data DL comprises metadata and lyrics data body. The metadata comprises musical piece information, such as a title of a musical piece, a name of a composer, and a name of a lyric writer. The musical piece information is used to identify the lyrics data DL requested from the acoustic system 50.

The lyrics data body comprises a group of character strings representing lyrics corresponding to the musical piece. Specifically, the lyrics data body is configured to comprise line data for respective lines defined by dividing the lyrics of the whole musical piece into a plurality of lines. The line data is configured to comprise, as a line start time, information on time to start reproduction of each part of the musical piece corresponding to the line. The line start time is represented by a time counted from the origin zero, which is the beginning of the musical piece. In other words, the line start time is represented by a reproduction period of time from the beginning of the musical piece.

The line data is configured to comprise information representing, for each phrase in a lyrics region corresponding to this line, a start time and an end time of this phrase and a character string of the lyrics corresponding to this phrase. The start time and the end time of the phrase are also represented by a time (reproduction period of time) counted from the origin, which is the beginning of the musical piece. In the line data, the character string of each phrase is defined as a character string that should be displayed during a period from the start time to the end time of this phrase.

Next, details of functions performed by the control unit 11 in the communication terminal 10 will be described with reference to FIG. 4. By executing the programs, the control unit 11 functions as a main controller 111, a first transmission controller 113, and a second transmission controller 115.

Figure 5:
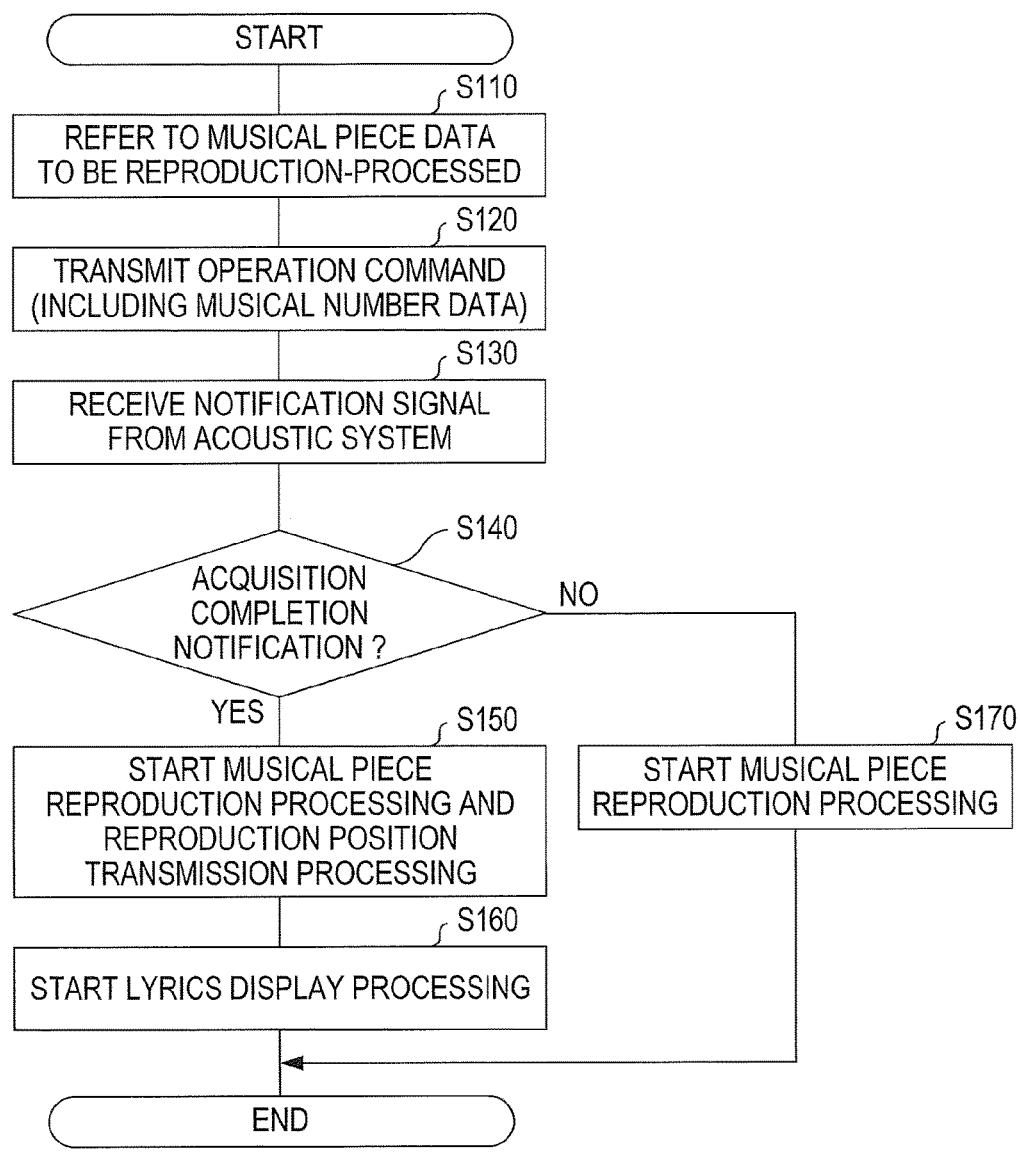
FIG. 5 is a flowchart showing a processing performed by a main controller.

The main controller 111 is configured to perform a processing shown in FIG. 5 on condition that a reproduction command for one of the musical piece data DM stored in the storage unit 13 has been inputted by the user via the user interface 15.

Specifically, when the reproduction command is inputted, the main controller 111 refers to the musical piece data DM to be reproduction-processed, which has been designated by the reproduction command (S110), and transmits an operation command, to which the musical number data corresponding to this musical piece data DM is attached, to the acoustic system 50 via the communication unit 17 (S120). Such transmission of the operation command and the musical number data is performed by wireless LAN communication on the basis of, for example, OSC (Open Sound Control) communication protocol.

Figure 4:
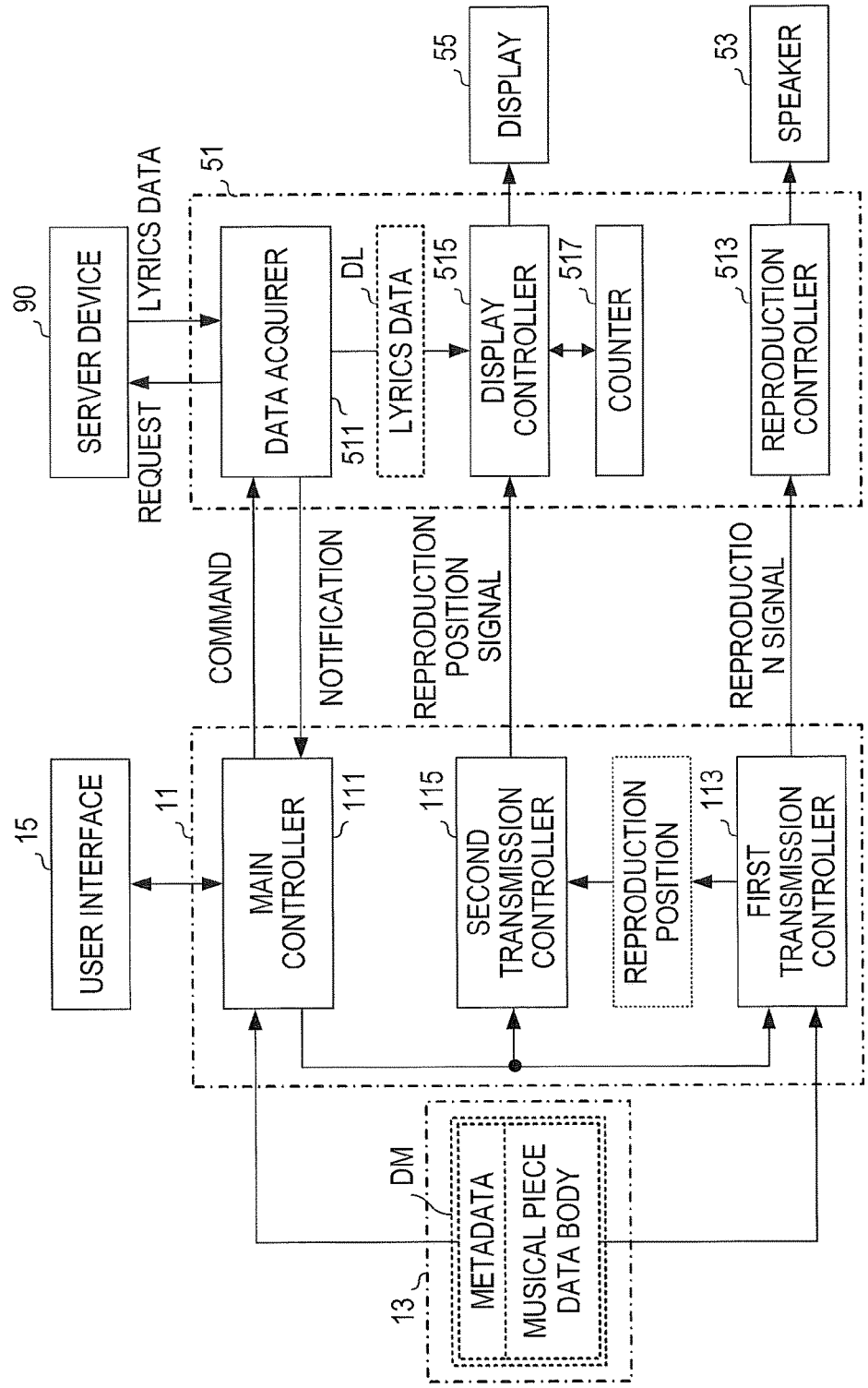
FIG. 4 is a block diagram showing functions performed by control units in the communication terminal and in the acoustic system.

As shown in FIG. 4, the musical piece data DM is configured with a musical piece data body and the metadata attached thereto. The metadata comprises the musical piece information, such as the title of the musical piece, the name of the composer, and the name of the lyric writer. Referring to this metadata, the main controller 111 transmits the operation command, to which the musical number data corresponding to the musical piece data DM to be reproduction-processed is attached, to the acoustic system 50 via the communication unit 17.

The musical number data is provided to the acoustic system 50 so that the acoustic system 50 can acquire, from the server device 90, the lyrics data DL corresponding to the musical piece data DM to be reproduction-processed. That is, the musical number data is transmitted as identification data that enables the acoustic system 50 and the server device 90 to identify the lyrics data DL corresponding to the musical piece data DM. The musical number data may be configured to comprise the musical piece information, such as the title of the musical piece, the name of the composer, and the name of the lyric writer.

Upon completion of transmission of the operation command, either an acquisition completion notification indicating that acquisition of the lyrics data DL from the server device 90 has been completed or an acquisition failure notification indicating that acquisition of the lyrics data DL from the server device 90 has been ended in failure is transmitted from the acoustic system 50 as a notification signal. The main controller 111 receives this notification signal from the acoustic system 50 via the communication unit 17 (S130).

Then, the main controller 111 switches a course of the processing depending on whether the received notification signal is the acquisition completion notification or the acquisition failure notification (S140). If the received notification signal is the acquisition completion notification (Yes in S140), the processing shown in FIG. 5 shifts to S150, where the main controller 111 gives a command to start a musical piece reproduction processing and a reproduction position transmission processing. The command to start the musical piece reproduction processing is inputted into the first transmission controller 113. The command to start the reproduction position transmission processing is inputted into the second transmission controller 115.

The first transmission controller 113 performs the reproduction processing on the musical piece data DM in accordance with the aforementioned start command, to thereby generate the reproduction signal for the musical piece data DM, and transmits this reproduction signal to the acoustic system 50 via the communication unit 17. The reproduction processing referred to herein may be a processing for performing steps that should be completed by the communication terminal 10 among reproduction steps taken until the musical piece is outputted from the speaker 53.

Thus, the reproduction processing performed by the first transmission controller 113 may be a process of chiefly decoding the musical piece data DM. For example, the reproduction processing may be a process of decoding the musical piece data DM into a form that allows the acoustic system 50 to output the musical piece from the speaker 53.

In the present embodiment, a process for performing streaming reproduction of the musical piece data DM is performed by the first transmission controller 113 as the aforementioned reproduction processing. Known as a technique for performing streaming reproduction of the musical piece data DM is AirPlay (registered trademark) by Apple, Inc. The first transmission controller 113 may be configured, using this kind of technique, to convert the musical piece data DM into the reproduction signal and to transmit this reproduction signal to the acoustic system 50 by short-distance wireless communication or wireless LAN communication.

On the other hand, the second transmission controller 115 is configured, in accordance with the aforementioned start command, to transmit the reproduction position signal representing a reproduction position of the musical piece data DM to be reproduction-processed by the first transmission controller 113. That is, the second transmission controller 115 transmits the reproduction position signal representing a position (reproduction position), with respect to the whole musical piece, of a sound to be outputted due to the reproduction signal transmitted by the first transmission controller 113.

The second transmission controller 115 may be configured to acquire information on the reproduction position managed by the first transmission controller 113 from the first transmission controller 113 and to transmit the reproduction position signal representing the reproduction position. The reproduction position signal may be configured, for example, as a signal representing the reproduction position as a time counted from the origin zero, which is the beginning of the musical piece, i.e., as a reproduction period of time from the beginning of the musical piece.

Figure 6:
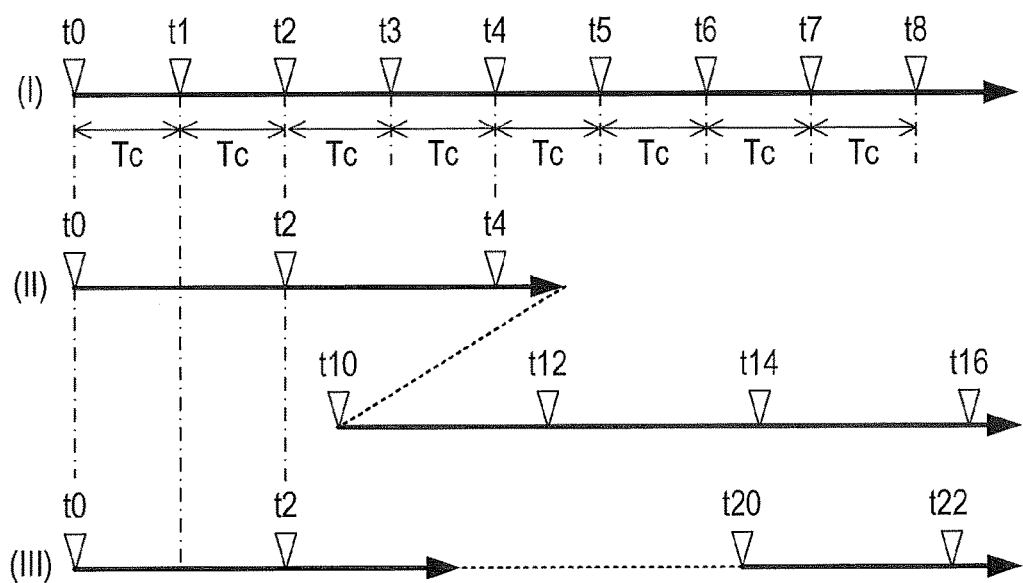
FIG. 6 is a diagram illustrating timings of transmitting reproduction position signals.

More specifically, the second transmission controller 115 may be configured to transmit the reproduction position signal, which represents the reproduction position at the time, to the acoustic system 50 at a specified time interval Tc, which is around one to a few seconds. Inverted triangles shown in FIG. 6 represent timings of transmitting the reproduction position signals. According to an example shown in an upper zone (I), the reproduction position signals are transmitted at respective times t0, t1, t2, t3, t4, t5, t6, t7, and t8 having the specified time interval Tc. The time t0 corresponds to the beginning of the musical piece (to a timing of starting reproduction of the musical piece).

Moreover, in some cases, a command relating to a trick play, such as a rewind reproduction command and a skip command, is inputted by the user via the user interface 15. In this case, the first transmission controller 113 performs the reproduction processing on the musical piece data DM so as to change the reproduction position, in accordance with the aforementioned command from the user.

When such a case is assumed, the method in which the reproduction position signal is transmitted at the specified time interval Tc is likely to cause a gap between the actual reproduction position and the reproduction position perceived by the acoustic system 50 on the basis of the reproduction position signal. Thus, the second transmission controller 115 may be configured, in the event of occurrence of irregular change of the reproduction position, to transmit the reproduction position signal representing the changed reproduction position upon occurrence of such an event.

According to an example shown in a middle zone (II) in FIG. 6, the second transmission controller 115 transmits the reproduction position signals at the respective times t0, t2, and t4 having a specified time interval 2Tc. Subsequently, when the reproduction position at the first transmission controller 113 is changed due to input of the rewind reproduction command, the second transmission controller 115 operates as below. Specifically, at a time point when the reproduction position is changed (at a time t10), the second transmission controller 115 operates to deviate from an operation of regular transmission of the reproduction position signal and to transmit the reproduction position signal.

Then, the second transmission controller 115 transmits the reproduction position signals at the specified time interval 2Tc beginning at the time t10 (i.e., at respective times t12, t14, and 16).

According to an example shown in a lower zone (III) in FIG. 6, the second transmission controller 115 transmits the reproduction position signals at the respective times t0 and t2 having the specified time interval 2Tc. Subsequently, when the reproduction position at the first transmission controller 113 is changed due to input of a skip reproduction command, the second transmission controller 115 operates as below. Specifically, at a time point when the reproduction position is changed (at a time t20), the second transmission controller 115 operates to deviate from the operation of regular transmission of the reproduction position signal and to transmit the reproduction position signal. Then, the second transmission controller 115 transmits the reproduction position signals at the specified time interval 2Tc beginning at the time t20 (for example, at a time t22).

The transmission cycle 2Tc of the reproduction position signal shown in the middle zone (II) and the lower zone (III) in FIG. 6 is longer than the transmission cycle Tc of the reproduction position signal shown in the upper zone (I). This suggests that, if the second transmission controller 115 is configured to transmit the reproduction position signal at a time point of occurrence of the event in which the reproduction position is changed in a discontinuous manner, a transmission cycle of the reproduction position signal at regular transmission can be prolonged. This is because a trick play or the like hardly causes a gap between the actual reproduction position and the reproduction position perceived by the acoustic system 50.

The above-described processings are started in the first transmission controller 113 and the second transmission controller 115 by the start command in S150 (see FIG. 5), and these processings are performed until reproduction of the musical piece is finished. When the reproduction of the musical piece is started by the processings in S150, the processing shown in FIG. 5 shifts to S160, where the main controller 111 performs a lyrics display processing to thereby cause the lyrics to be displayed on the user interface 15 concurrently with the reproduction of the musical piece.

In the present embodiment, the acoustic system 50 transmits the lyrics data DL acquired from the server device 90 to the communication terminal 10 together with the aforementioned acquisition completion notification. This lyrics data DL is received in S130 together with the notification signal. The lyrics display processing performed by the main controller 111 in S160 is a processing of causing the lyrics to be displayed on the user interface 15 (liquid crystal display) on the basis of the lyrics data DL. In the lyrics display processing, the main controller 111 acquires the information on the reproduction position from the first transmission controller 113, and controls the user interface 15 so as to display the character string of the lyrics corresponding to the reproduction position.

Specifically, the main controller 111 identifies a lyrics phrase corresponding to the reproduction position on the basis of a phrase start time and a phrase end time of each phrase represented by the lyrics data DL. To be more specific, the main controller 111 identifies, as the phrase corresponding to the reproduction position, a phrase in which the reproduction period of time (reproduction time) counted from the beginning of the musical piece, which time is represented by the reproduction position, is within a period from the phrase start time to the phrase end time. Then, the main controller 111 controls the user interface 15 so that the character string of the aforementioned identified phrase represented by the lyrics data DL is displayed on the liquid crystal display as a character image. The main controller 111 continues this lyrics display processing until the reproduction of the musical piece is finished, and then, terminates the lyrics display processing (S160) and the processing shown in FIG. 5.

Additionally, if the notification signal received from the acoustic system 50 is the acquisition failure notification (No in S140), the processing shown in FIG. 5 shifts to S170, where the main controller 111 gives a command to start the musical piece reproduction processing as in S150. Then, the main controller 111 terminates the processing shown in FIG. 5. If the acquisition failure notification is received, the acoustic system 50 does not have the lyrics data DL corresponding to the musical piece data DM to be reproduction-processed. In this case, the acoustic system 50 cannot display the lyrics on the display 55 concurrently with the reproduction of the musical piece.

In S170, in order to cause the acoustic system 50 to output the musical piece from the speaker 53 without displaying the lyrics, the start command is not inputted into the second transmission controller 115, but the start command is inputted into the first transmission controller 113.

Next, details of functions performed by the control unit 51 in the acoustic system 50 will be described with reference to FIG. 4. By executing the programs, the control unit 51 in the acoustic system 50 functions as a data acquirer 511, a reproduction controller 513, a display controller 515, and a counter 517.

The data acquirer 511 acquires the lyrics data DL from the server device 90 in accordance with an operation command from the communication terminal 10. To acquire the lyrics data DL, the data acquirer 511 repeatedly performs a processing shown in FIG. 7. After this processing is started, the data acquirer 511 waits for the operation command and the musical number data transmitted in S120 from the communication terminal 10 to be received via the communication unit 57. Then, when the operation command and the musical number data are received (Yes in S210), the processing shown in FIG. 7 shifts to S220.

In S220, the data acquirer 511 requests the server device 90 to provide the lyrics data DL corresponding to the musical piece data DM to be reproduction-processed by the communication terminal 10, on the basis of the musical number data received from the communication terminal 10. For example, the data acquirer 511 transmits the request signal including the title of the musical piece and so on represented by the received musical number data to the server device 90 via the communication unit 57.

Upon transmission of this request signal, the above-described response signal is transmitted from the server device 90. The data acquirer 511 receives the response signal from the server device 90 via the communication unit 57 (S230). Then, it is determined whether the response signal includes the lyrics data DL (S240).

Figure 7:
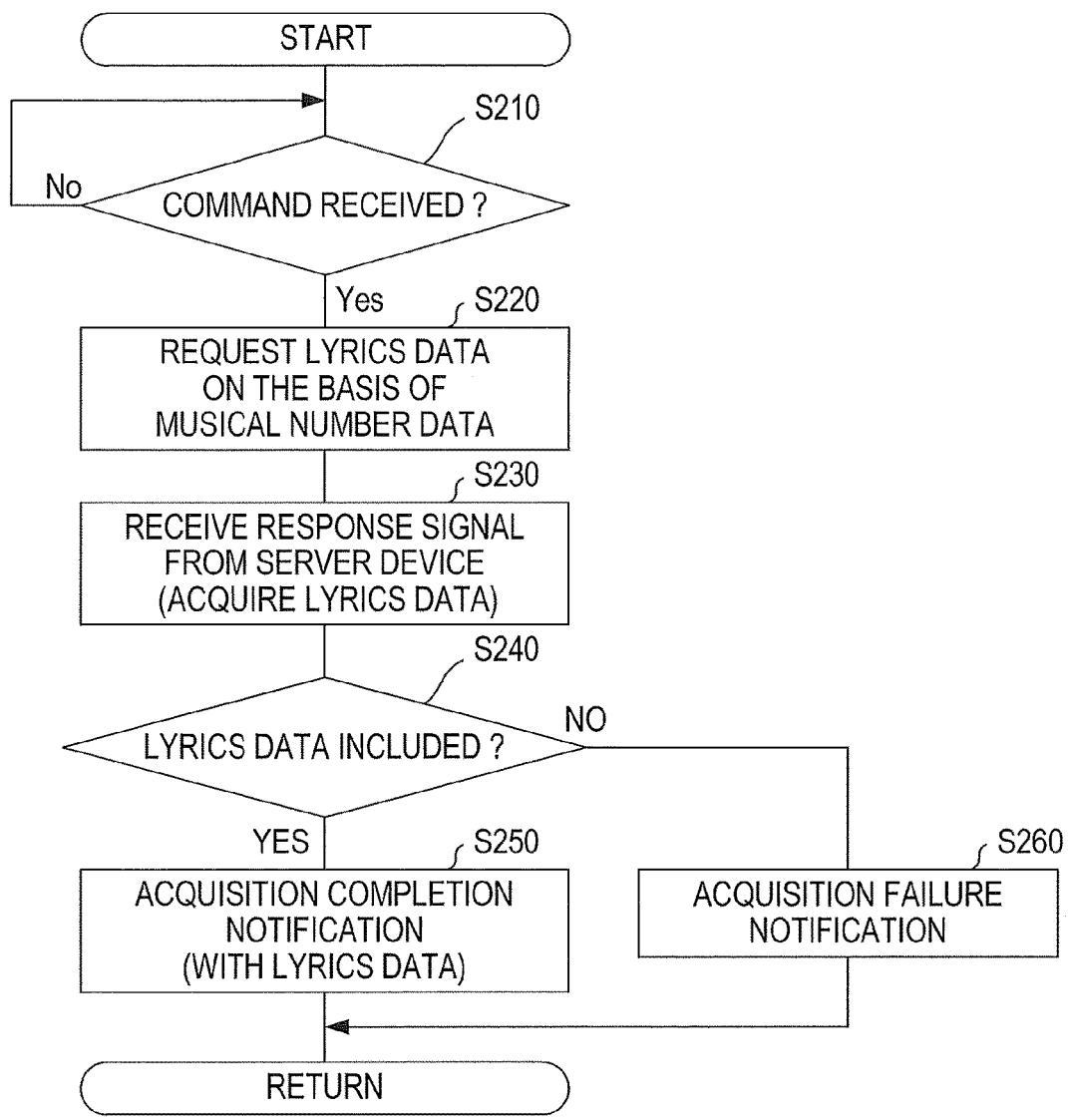
FIG. 7 is a flowchart showing a processing performed by a data acquirer.

Here, if it is determined that the response signal includes the lyrics data DL (Yes in S240), the processing shown in FIG. 7 shifts to S250, where the data acquirer 511 transmits the acquisition completion notification to the communication terminal 10, which is a source of the operation command, via the communication unit 57. The data acquirer 511 can transmit the acquisition completion notification with the lyrics data DL attached thereto, which has been acquired from the server device 90.

In contrast, if the response signal does not include the lyrics data DL (No in S240), the processing shown in FIG.

7 shifts to S260, where the data acquirer 511 transmits the acquisition failure notification to the effect that acquisition of the lyrics data DL has ended in failure to the communication terminal 10, which is the source of the operation command, via the communication unit 57. After the aforementioned transmission of the acquisition completion notification or the acquisition failure notification, the data acquirer 511 terminates the processing shown in FIG. 7 temporarily.

After the aforementioned transmission of the acquisition completion notification or the acquisition failure notification, the reproduction controller 513 receives the reproduction signal transmitted from the communication terminal 10 via the communication unit 57, and causes the speaker 53 to output the sound based on this reproduction signal sequentially upon receipt, to thereby perform reproduction of the musical piece via the speaker 53. For example, the reproduction controller 513 converts the received reproduction signal into an analog audio signal and inputs this signal into the speaker 53, to thereby cause the speaker 53 to output the sound based on the reproduction signal. In a case where AirPlay is used for streaming reproduction of the musical piece data DM, the reproduction controller 513 can operate to sequentially convert the reproduction signal transmitted in compliance with this standard into an input signal to the speaker 53.

On the other hand, after the aforementioned transmission of the acquisition completion notification, the display controller 515 receives the reproduction position signal transmitted from the communication terminal 10 via the communication unit 57, and controls the display 55 so that the character string of the lyrics corresponding to the sound outputted from the speaker 53 is displayed on the display 55, on the basis of this reproduction position signal and the lyrics data DL.

For example, the display controller 515 may be configured to correct a time counted by the counter 517 to a time corresponding to the reproduction position represented by the received reproduction position signal. The counter 517 is reset to zero by operation of the display controller 515 based on the reproduction position signal transmitted from the communication terminal 10 at the time of start of the reproduction of the musical piece (at the time t0). The counter 517 counts a subsequent lapse time.

Each time the display controller 515 receives the reproduction position signal, the time counted by the counter 517 is corrected to the time corresponding to the reproduction position represented by the reproduction position signal, by operation of the display controller 515. Such correction allows the time counted by the counter 517 to be corrected to a time essentially consistent with the reproduction period of time from the beginning of the musical piece. Thus, the time counted by the counter 517 functions as a parameter indicating the reproduction position of the musical piece, which parameter is not affected greatly by a trick play.

The display controller 515 may be configured to cause the display 55 to display the character string of the lyrics corresponding to the sound outputted from the speaker 53, on the basis of the time counted by the counter 517 and the lyrics data. The counter 517 is beneficial in that it enables the display controller 515 to identify the reproduction position of the sound outputted from the speaker 53 during a period in which the reproduction position signal is not received. Thus, the counter 517 functions especially effectively when a transmission interval of the reproduction position signal is long. In contrast, when the transmission interval of the reproduction position signal is short, the counter 517 need not be provided.

The display controller 515 can control the display 55 so that the character string of the lyrics corresponding to the reproduction position of the sound outputted from the speaker 53 is displayed on the display 55, on the basis of the lyrics data DL acquired by the data acquirer 511, in a manner similar to the lyrics display processing performed in the communication terminal 10 in S160.

Due to the reproduction position signal being provided from the communication terminal 10 to the acoustic system 50, in the communication terminal 10 and the acoustic system 50, the character string of the lyrics corresponding to a reproduced section of the musical piece outputted from the speaker 53 is displayed on the user interface 15 and the display 55 approximately in synchronization with each other. The reason for using the expression "approximately in synchronization" here is that time lag due to communication may cause a slight error between the reproduction position perceived by the communication terminal 10 and the reproduction position perceived by the acoustic system 50.

So far, the music reproduction system 1 of the present embodiment has been described. According to the music reproduction system 1, reproduction of the musical piece can be performed by the acoustic system 50 using the musical piece data DM of the communication terminal 10. Moreover, synchronously with output of a series of sounds (musical piece) represented by the musical piece data DM, the acoustic system 50 can output, as an image, words (character string) of the lyrics corresponding to the output sounds. Thus, according to the music reproduction system 1, a new way of enjoying musical pieces can be provided to the user, and the user's enjoyment of listening to musical pieces can be enhanced.

For example, the user can enjoy musical pieces as sounds using the acoustic system 50, with the enjoyment of seeing the lyrics of the musical pieces. In addition, the user can share musical pieces and the lyrics thereof with other users staying in the same space where the acoustic system 50 is present. In other words, according to the acoustic system 50, some musical piece providers' wish to provide enjoyment of musical pieces together with the lyrics thereof can be met, and some consumers' desire to enjoy musical pieces together with the lyrics thereof also can be met sufficiently.

In the aforementioned embodiment, it is remarkable that, by providing the reproduction position signal from the communication terminal 10 to the acoustic system 50, it is enabled to display the lyrics synchronously with reproduction of the musical piece in the acoustic system 50, while utilizing the existing musical piece data DM and the existing streaming reproduction technology.

Further, in the aforementioned embodiment, the acoustic system 50 acquires the lyrics data DL from the server device 90, and provides the acquired lyrics data DL to the communication terminal 10. The communication terminal 10 causes the character string of the lyrics corresponding to the sound outputted from the speaker 53 to be displayed on the user interface 15 on the basis of the lyrics data DL received from the acoustic system 50. Such display of the lyrics is performed approximately in synchronization between the acoustic system 50 and the communication terminal 10.

Accordingly, the user can see the lyrics displayed by the acoustic system 50 and also can see the lyrics displayed by the communication terminal 10 at hand. As above, the music reproduction system 1 of the present embodiment is very beneficial in that it brings about an effect that the user can enjoy musical pieces comfortably.

First Modified Example

Next, a first modified example of the aforementioned embodiment will be described. As shown in broken lines in FIG. 1, the music reproduction system 1 of the first modified example is configured such that the acoustic system 50 transmits the lyrics data DL and the reproduction position signal to a communication terminal 10A, which is different from the communication terminal 10, i.e., a source of the operation command, via the communication unit 57. Hereafter, as for configurations and operations of the music reproduction system 1 of the present modified example, configurations and operations different from those of the aforementioned embodiment will be explained, and an explanation of the same configurations and operations will be omitted as appropriate.

According to the present modified example, the data acquirer 511 is configured to transmit the lyrics data DL not only to the communication terminal 10, i.e., the source of the operation command, but also to the communication terminal 10A in S250 (see FIG. 7). Examples of the communication terminal 1 OA may include a communication terminal within the same local area network as that of the acoustic system 50, and a communication terminal that can perform short-distance communication with the acoustic system 50. Further, in the present modified example, the display controller 515 is configured to transmit the reproduction position signal received from the communication terminal 10 to the communication terminal 10A via the communication unit 57.

According to the thus-configured music reproduction system 1, the communication terminal 10A can display the lyrics on an internal display synchronously with reproduction of the musical piece by the acoustic system 50, similarly to the communication terminal 10. For example, the communication terminal 10A can display the lyrics on the internal display by a method similar to that of the display controller 515.

Since the lyrics display can be performed in a plurality of communication terminals, i.e., the communication terminals 10 and 10A, the musical piece and the lyrics thereof can be shared among multiple users who own the communication terminals 10 and 10A, to thereby enhance the enjoyment of the musical piece. As a further modified example of the present modified example, the acoustic system 50 may be configured to provide the musical number data acquired from the communication terminal 10, instead of the lyrics data DL, to the communication terminal 10A. In this case, the communication terminal 10A may be configured to acquire the lyrics data DL corresponding to the musical piece data DM to be reproduction-processed from the server device 90, on the basis of the received musical number data.

Second Modified Example

Figure 8:
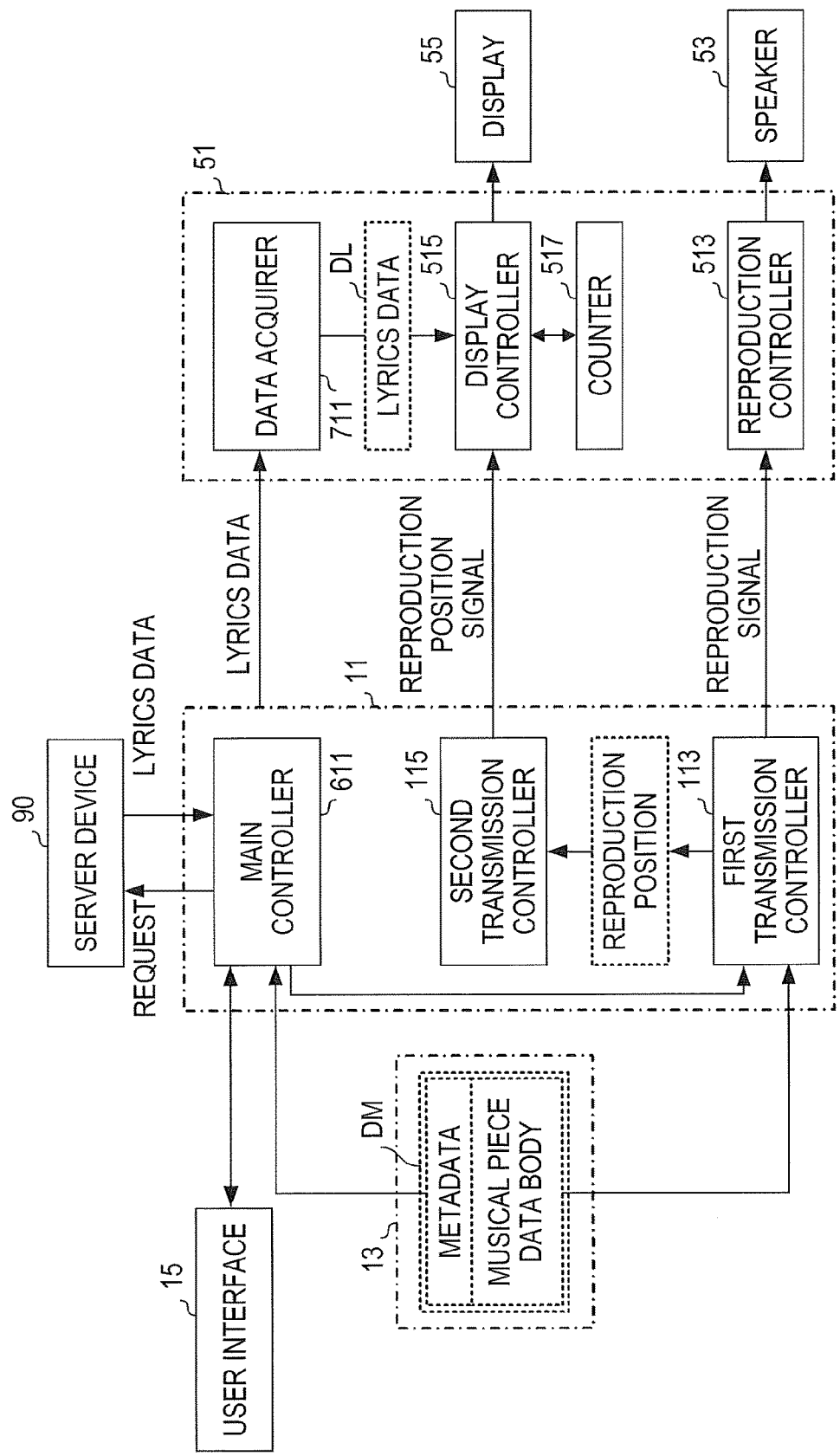
FIG. 8 is a block diagram showing functions performed by the control units in the communication terminal and in the acoustic system in a music reproduction system of a second modified example.

Next, a second modified example of the aforementioned embodiment will be described. As shown in FIG. 8, the music reproduction system 1 of the second modified example is configured such that the communication terminal 10 acquires the lyrics data DL from the server device 90. Hereafter, as for configurations and operations of the music reproduction system 1 of the present modified example, configurations and operations different from those of the aforementioned embodiment will be explained, and an explanation of the same configurations and operations will be omitted as appropriate.

In the present modified example, the control unit 11 of the communication terminal 10 functions as a main controller 611 instead of the main controller 111. On condition that a reproduction command for one of the musical piece data DM stored in the storage unit 13 has been inputted by the user via the user interface 15, the main controller 611 refers to the metadata of the musical piece data DM to be reproduction-processed, and requests the server device 90 to provide the lyrics data DL corresponding to this musical piece data DM.

For example, the main controller 611 can transmit the request signal including the title of the musical piece and so on represented by the metadata to the server device 90 via the communication unit 17. The communication unit 17 is configured to be capable of performing wide area communication. The main controller 611 receives the response signal to this request signal from the server device 90. If the lyrics data DL is included in the response signal, the main controller 611 transmits this lyrics data DL to the acoustic system 50 via the communication unit 17, and then, performs processings similar to those in S150 and S160. If the lyrics data DL is not included in the response signal, the main controller 611 performs a processing similar to that in S170.

As the processing similar to that in S160, the main controller 611 can perform a processing of displaying the character string of the lyrics corresponding to the sound outputted from the acoustic system 50 on the user interface 15, on the basis of the lyrics data DL that the main controller 611 has acquired from the server device 90.

According to the present modified example, the control unit 51 in the acoustic system 50 functions as a data acquirer 711 instead of the data acquirer 511. The data acquirer 711 receives the lyrics data DL from the communication terminal 10 via the communication unit 57, and provides this lyrics data DL to the display controller 515. According to the present modified example, the lyrics data DL can be provided to the acoustic system 50 without having to configure the acoustic system 50 to be capable of performing wide area communication.

Other Embodiment

The present invention can be implemented in further various modes. Although the aforementioned embodiment and the first and the second modified examples address the musical piece data DM and the lyrics data DL, technological thought corresponding to the present invention can be applied to a video reproduction system that processes video data with voice sound and subtitle data. In this case, the acoustic system may be configured to reproduce a video while displaying subtitles corresponding to the video. Examples of the subtitles may include, for example, a translation text of voice sound in the video and a commentary text.

Referring to the aforementioned embodiment and the first and the second modified examples, the lyrics data DL may be data for literally displaying, using characters, the lyrics reproduced with voice sound, or may be data for displaying the lyrics in a language different from that of the lyrics reproduced with voice sound. For example, the lyrics data DL may be configured to be capable of displaying lyrics in English of the musical piece sung in Japanese. Such a display mode of the lyrics functions usefully in a case where an original musical piece corresponding to the musical piece to be reproduced exists as a song in a different language.

Further, exemplified in the aforementioned embodiment is the lyrics data DL having a data structure in which each character string constituting the lyrics is divided into phrases. However, it is sufficient for the lyrics data DL to have a data structure including information defining a correspondence relationship between each section of the lyrics and the reproduction position, and thus, the lyrics data DL is not limited to one having the exemplified data structure. For example, instead of including the character strings divided into phrases, the above-described line data of the lyrics data DL may be one including the start time (and the end time) of each line and the character strings of each line.

Additionally, assuming environments in which no trick play exists, such as irregular change of the reproduction position, the reproduction position signal need not to be used. Specifically, the acoustic system 50 may operate to measure, using the counter 517, a lapse time from the point of time when output of the musical piece from the speaker 53 on the basis of the reproduction signal is started, and to display the character string of the lyrics corresponding to the output sound on the display 55, considering the measured lapse time as the time corresponding to the reproduction position.

Furthermore, the acoustic system 50 may be configured to analyze the reproduction signal from the communication terminal 10 or the sound outputted from the speaker 53 to thereby extract the lyrics. In this case, the acoustic system 50 can display the lyrics extracted by such analysis. Thus, the lyrics data DL need not to be acquired from the server device 90.

Similarly, the acoustic system 50 may be configured to analyze the reproduction signal from the communication terminal 10 or the sound outputted from the speaker 53 to thereby identify the title of the musical piece. In this case, the acoustic system 50 can acquire the corresponding lyrics data DL from the server device 90 without having to receive the musical number data from the communication terminal 10.

The lyrics display in the acoustic system 50 may be performed in a mode in which a part of the lyrics is highlighted. For example, in the lyrics data DL, a mark can be placed on a character string that should be highlighted. The acoustic system 50 may be configured to control the display 55 to highlight the part of the lyrics in accordance with this mark. Such highlighting may be performed for a part of the lyrics including a message that the musical piece provider especially wishes to convey.

The visual effects displayed on the display 55 in the acoustic system 50 may be changed in accordance with operation by the user via the user interface 15. For example, the communication terminal 10 may be configured to transmit a visual effects operation signal inputted via the user interface 15, to the acoustic system 50 via the communication unit 17.

On the other hand, the acoustic system 50 may be configured to control the display 55 to change the visual effects on the basis of the aforementioned operation signal received from the communication terminal 10. For example, the display 55 may be controlled such that, when the user of the communication terminal 10 performs an operation of tapping on the user interface 15, an animation that seems as if vibration due to the tapping has been transmitted appears as the visual effects in response to the tapping operation. Such an animation may be added to an image of a character string of the lyrics.

Part or all of the functions performed in the control units 11 and 51 by the programs may be performed by a dedicated hardware circuit.

Additionally, the programs for causing the control unit 11 to function as the main controller 111, the first transmission controller 113, and the second transmission controller 115 may be recorded on a recording medium of any forms that can be read by a computer. For example, these programs may be stored in a portable semiconductor memory, a magnetic disk, an optical disk, and so on and provided to the user. The program may be provided to or installed in the communication terminal 10 through the network.

Furthermore, the communication between the communication terminal 10 and the acoustic system 50 can be performed using any communication technology within an appropriate range, and is not limited to AirPlay, Bluetooth communication, and so on that have been illustrated. It is needless to say that the communication between the communication terminal 10 and the acoustic system 50 can be performed using a plurality of communication standards or a single communication standard. The communication may be performed through the different communication standard depending on types of the data and signals to be transmitted and received. Although the communication between the communication terminal 10 and the acoustic system 50 is referred to here, the same applies to the communication between the acoustic system 50 and the server device 90, and the communication between the communication terminal 10 and the server device 90.

Correspondence Relationships

In closing, correspondence relationships between the terms will be described. The speaker 53 and the display 55 correspond to one example of an output unit, and the user interface 15 corresponds to one example of a display unit. The reproduction controller 513 corresponds to one example of a first output control unit, the display controller 515 corresponds to one example of a second output control unit, and the data acquirers 511 and 711 correspond to one example of an acquisition control unit. Additionally, the first transmission controller 113 corresponds to one example of a first transmission control unit, the second transmission controller 115 corresponds to one example of a second transmission control unit, and the main controllers 111 and 611 correspond to one example of a display control unit.

The invention claimed is:
1. An acoustic system comprising:
an output unit configured to output a sound and an image;
a communication unit configured to wirelessly communicate with a communication device;
a first output control unit configured to wirelessly receive, from the communication device a reproduction signal for acoustic data via the communication unit and, in response to receiving the reproduction signal, cause the output unit to output a sound based on the reproduction signal, so as to perform reproduction of a series of sounds represented by the acoustic data;
a second output control unit configured to wirelessly receive a reproduction position signal representing a reproduction position, in the acoustic data, of the sound outputted on the basis of the reproduction signal from the communication device via the communication unit, and cause the output unit to output, as the image, a word corresponding to the sound outputted by the output unit among the series of sounds represented by the acoustic data, on the basis of the reproduction position signal; and
a counter for output control of the image configured to count a reproductions period of time,
wherein the second output control unit corrects the reproduction period of time counted by the counter to a time corresponding to the reproduction position represented by the received reproduction position signal, and causes the output unit to output, as the image, the word corresponding to the sound outputted by the output unit, on the basis of the reproduction period of time counted by the counter.

2. The acoustic system according to claim 1, comprising an acquisition control unit configured to acquire image output data corresponding to the acoustic data from the communication device via the communication unit,
wherein the image output data comprises a plurality of words corresponding to the series of sounds represented by the acoustic data, and
wherein the second output control unit causes the output unit to output, as the image, the word corresponding to the sound outputted by the output unit among the plurality of words, on the basis of the image output data.

3. The acoustic system according to claim 1,
wherein the acoustic data is musical piece data, and
wherein the second output control unit causes the output unit to output, as the image, the word of lyrics corresponding to a part outputted by the output unit, in a musical piece represented by the musical piece data, which is the series of sounds.

4. The acoustic system according to claim 1, comprising an acquisition control unit configured to acquire image output data corresponding to the acoustic data from a server device, which is different from the communication device, via the communication unit,
wherein the image output data comprises a plurality of words corresponding to the series of sounds represented by the acoustic data, and
wherein the second output control unit causes the output unit to output, as the image, the word corresponding to the sound outputted by the output unit among the plurality of words, on the basis of the image output data.

5. The acoustic system according to claim 4,
wherein the acquisition control unit transmits the image output data acquired from the server device to the communication device via the communication unit.

6. The acoustic system according to claim 4,
wherein the acquisition control unit receives identification data that allows for identification of the image output data corresponding to the acoustic data, from the communication device via the communication unit, and acquires the image output data corresponding to the acoustic data from the server device on the basis of the received identification data.

7. The acoustic system according to claim 4,
wherein the image output data comprises information that defines, for each of the plurality of words, a correspondence relationship between the reproduction position of the sound in the acoustic data and the word, and
wherein the second output control unit causes the output unit to output, as the image, the word corresponding to the reproduction position of the sound outputted by the output unit among the plurality of words, on the basis of the information that defines the correspondence relationship.

8. The acoustic system according to claim 4,
wherein the acoustic data is musical piece data,
wherein the image output data is lyrics data, and
wherein the second output control unit causes the output unit to output, as the image, the word of lyrics corresponding to a part outputted by the output unit, in a musical piece represented by the musical piece data, which is the series of sounds, on the basis of the lyrics data corresponding to the musical piece data.

9. A communication device configured to wirelessly communicate with an acoustic system according to claim 1, the communication device comprising:
a storage unit configured to store acoustic data;
a first transmission control unit configured to perform a reproduction processing on the acoustic data on condition that a reproduction command for the acoustic data has been inputted, and wirelessly transmit, to the acoustic system, the reproduction signal that causes the acoustic system to output the series of sounds represented by the acoustic data; and
a second transmission control unit configured to wirelessly transmit, to the acoustic system, the reproduction position signal representing a reproduction position, in the acoustic data, of a sound outputted on the basis of the reproduction signal among the series of sounds,
wherein the second transmission control unit wirelessly transmits the reproduction position signal to the acoustic system when a command that causes a change of the reproduction position is inputted.

10. The communication device according to claim 9, further comprising:
a display unit configured to output an image; and
a display control unit configured to receive image output data comprising a plurality of words corresponding to a series of sounds represented by the acoustic data from the acoustic system, and cause the display unit to output, as the image, a word corresponding to a sound outputted by the acoustic system, on the basis of the received image output data.

11. The communication device according to claim 9, further comprising:
a display unit configured to output an image; and
a display control unit configured to acquire image output data comprising a plurality of words corresponding to a series of sounds represented by the acoustic data, and transmit the image output data to the acoustic system, as well as cause the display unit to output, as the image, a word corresponding to a sound outputted by the acoustic system, on the basis of the image output data.

12. The communication device according to claim 9,
wherein the second transmission control unit wirelessly transmits the reproduction position signal periodically to the acoustic system, and further wirelessly transmits the reproduction position signal to the acoustic system when a command relating to a trick play that causes a change of reproduction position is inputted.

13. A method implemented by a communication device configured to communicate with an acoustic system according to claim 1, the method comprising:
performing a reproduction processing on acoustic data on condition that a reproduction command for the acoustic data has been inputted, and wirelessly transmitting, to the acoustic system, the reproduction signal that causes the acoustic system to output the series of sounds represented by the acoustic data; and wirelessly transmitting, to the acoustic system, the reproduction position signal representing a reproduction position, in the acoustic data, of a sound outputted on the basis of the reproduction signal among the series of sounds, wherein the transmitting the reproduction position signal comprises wirelessly transmitting the reproduction position signal to the acoustic system at least when a command that causes a change of the reproduction position is inputted.

14. The method according to claim 13, further comprising:

acquiring image output data corresponding to the acoustic data, the image output data comprising a plurality of words corresponding to the series of sounds represented by the acoustic data;

transmitting the acquired image output data to the acoustic system; and causing a display unit provided to the communication device to display a word corresponding to a sound outputted by the acoustic system, on the basis of the acquired image output data.

15. The method according to claim 13, further comprising:

receiving image output data comprising a plurality of words corresponding to the series of sounds represented by the acoustic data from the acoustic system; and causing a display unit provided to the communication device to display a word corresponding to a sound outputted by the acoustic system, on the basis of the received image output data.

16. A non-transitory computer readable medium storing instructions for causing a processor to perform a method according to claim 13.

17. The method according to claim 13, wherein the wirelessly transmitting the reproduction position signal includes wirelessly transmitting the reproduction position signal periodically to the acoustic system, and further wirelessly transmitting the reproduction position signal to the acoustic system when a command relating to a trick play that causes a change of the reproduction position is inputted.

* * * * *